K. ALT.
COOKING STOVE.
APPLICATION FILED APR. 12, 1911.
1,088,251.
Patented Feb. 24, 1914.
Fig. 1.
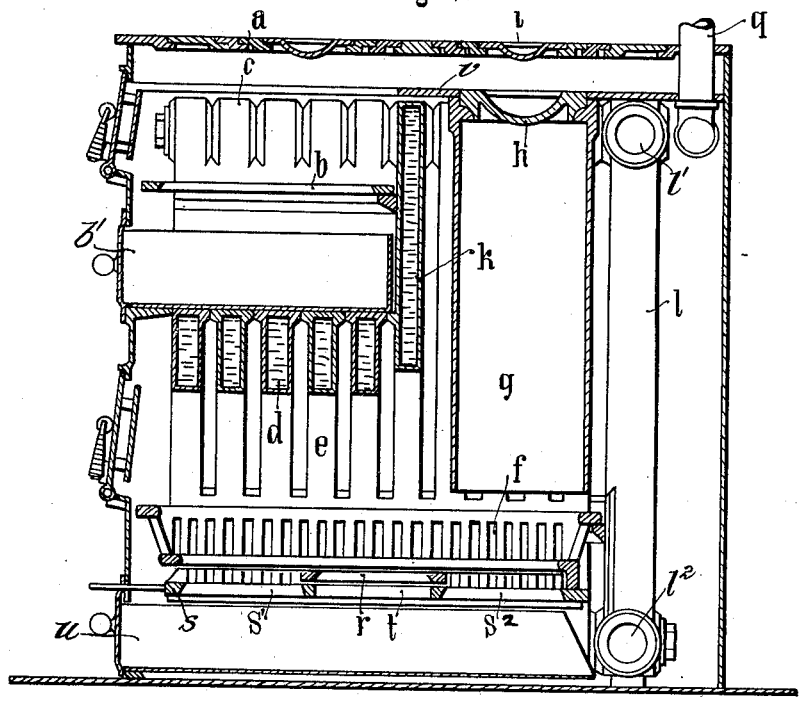
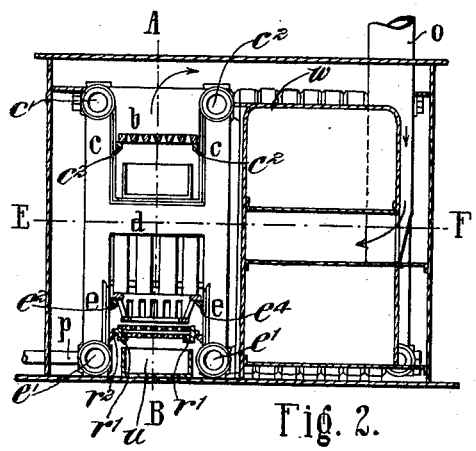
Fig. 2.
Fig. 3.
WITNESSES:
John C. Sanders
Arthur S. Petit
INVENTOR:
Karl Alt
BY
ATT'Y

UNITED STATES PATENT OFFICE.

KARL ALT, OF STRASSBURG, GERMANY.

COOKING-STOVE.

1,088,251.  Specification of Letters Patent.  Patented Feb. 24, 1914.

Application filed April 12, 1911. Serial No. 620,676.

*To all whom it may concern:*

Be it known that I, KARL ALT, a subject of the Emperor of Germany, and residing at 8 Fasanengasse, Strassburg, Alsace-Lorraine, Germany, have invented a new and useful Cooking-Stove, of which the following is a specification.

My invention relates to an improved cooking and heating apparatus having, among others, any or all of the following advantages: that it can be used both for cooking and for heating a dwelling; that it is provided with two fireplaces, one for cooking and one for heating; that the cooking fireplace may also heat the water of a hot water heating system; that the water containing parts of the hot water heater may serve in the place of the ordinary hot water reservoir of a cooking stove or range, especially when the hot water system for heating the dwelling is not being used; that it shall provide a large, unobstructed top surface for cooking utensils; and, notwithstanding this, that its heating apparatus shall be of the magazine type so as to require the minimum amount of attention; and to such ends my invention consists in the combined cooking and heating apparatus hereinafter specified.

In the accompanying drawings Figure 1 is a longitudinal section of an apparatus embodying my invention, this section being taken on the line A—B of Fig. 2; Fig. 2 is a longitudinal section on the line C—D of Fig. 3; and Fig. 3 is a horizontal section on the line E—F of Fig. 2.

While I have illustrated the best embodiment of my invention known to me, in the accompanying drawings, such embodiment is to be regarded as typical only of many possible embodiments, and my invention is not to be confined thereto.

In the embodiment shown in the accompanying drawings, I have provided a casing which, in the present instance, is shown as rectangular, and in which are contained a hot water heater with its own fire grate, a cooking fireplace, an oven, etc. The two fireplaces in the present embodiment are chiefly supported by the water-containing parts of the heating apparatus. The water-containing parts immediately adjacent to the grates consist chiefly of hollow H-shaped sections comprising lower legs $e$, upper legs $c$ and cross-connections $d$, all of which are hollow. The upper legs are provided with ledges $c^2$ upon which rests the grate $b$ of the cooking fireplace. A door is provided in the front of the casing above the level of the grate to permit the introduction of fuel. A drawer $b'$ extends through an opening in the front of the casing and rests upon the connections $d$, such drawer being for the reception and removal of ashes falling from the grate $b$. The lower legs $e$ are provided with ledges $e^2$ upon which rests the grate $f$ of the heating fireplace which, in the present instance, is in the form of a basket. Below the basket $f$ a grate $r$ is supported, such grate having its short central bars running longitudinally, as shown in the drawing, and beneath the grate $r$ is a sliding grate $s$ having front and rear grated portions $s'$ $s^2$ and an intermediate opening $t$, such sliding part being supported upon inturned flanges $r'$. When it is desired to remove the ashes from the basket the sliding grate is drawn forward until its opening $t$ is forward of the grate $r$, or if desired, is drawn entirely out so that ashes can be caused to drop forward or rearward from the grate $r$. The grate $r$, in the present instance, is supported on ledges $r^2$ formed on the lower water legs. A door is provided above the level of the basket for the introduction of fuel to the basket.

Immediately back of the cooking grate is a water partition $k$ connecting the legs of the water section, and unconnected vertical legs $m$ and $n$ extend in a row, respectively, on opposite sides in line with the legs of the preceding sections the adjacent sections having communicating openings. At the rear a vertical row of straight water sections $l$ is placed, such sections being connected at the top as by a pipe $l'$ and at the bottom as by a pipe section $l^2$. Within the rectangular space formed by the sections $k$, $m$, $n$ and $l$ is placed the magazine $g$ of the hot water heater, the latter being suspended from a plate $v$ extending across the water sections at the top. The top of the casing is formed by a cooking surface $a$ which, as usual, is provided with removable lids so as to expose vessels to the fire and to permit the introduction of fuel to the fire. The magazine $g$ is closed by a cap $h$ and above it in the plate $a$ is a lid $i$ so that when both said cap and said lid are removed, coal may be introduced into the magazine. Water enters the hot water sections through the pipe $p$ at the bottom toward one of the forward legs $e$, and it leaves by a pipe $q$ connected at the top of the water sections $l$. An oven $w$ is provided preferably at the side of the cooking fireplace, and the hot gases from the cooking fireplace pass over the oven as shown by the arrow in Fig. 2, and then pass downward along its outer side and under the oven, and turn into the flue $o$ and thence pass to the chimney.

In the operation of the described embodiment of my heating apparatus, the cooking is effected by the use of the upper fireplace just as though there were no hot water heating apparatus present, and likewise the hot water heater may be run just as though there were no cooking apparatus present, except that each assists the other in heating the water in the water-containing sections. When it is desired to heat the house, the pipes $p$ and $q$ being open, the water is heated in hot water sections and rises through the pipe $q$ to the radiators, and being cooled, descends and reënters the apparatus through the pipe $p$. At the same time, the water thus heated may be used for the ordinary purposes of hot water in cooking, and the usual hot water "boiler" or reservoir of a cooking range is thus dispensed with. When it is not desired to heat the dwelling, the pipes $p$ and $q$ may be closed and the hot water heater fireplace, being inactive, the heat of the cooking fireplace may be utilized to heat the water in the hot water sections so that it can be used for cooking purposes as before described in place of the boiler or reservoir of a cooking range.

My hot water heater being heated by a magazine heater, as described, it will run for a long time without attention so that although the apparatus is very compact, a person doing the cooking can, without much additional trouble, attend to the heating of the dwelling.

I claim:

1. In a combined heating and cooking apparatus, the combination of H-shaped water sections, a relatively short cooking fireplace located between the upper legs, a relatively long heating fireplace located between the lower legs and extending to the rear thereof, a magazine over the rear portion of the latter fireplace and in the rear of the cooking fireplace and of the said water sections, and a flat cooking plate or surface extending over both said cooking fireplace and said magazine.

2. In a combined heating and cooking apparatus, the combination of H-shaped water sections, a relatively short cooking fireplace located between the upper legs, a relatively long heating fireplace located between the lower legs and extending to the rear thereof, a magazine over the rear portion of the latter fireplace and in the rear of the cooking fireplace and of the said water sections, and a flat cooking plate or surface extending over both said cooking fireplace and said magazine, said plate or surface being provided with removable lids over said cooking fireplace and magazine.

3. In a combined heating and cooking apparatus, the combination of H-shaped water sections, a relatively short cooking fireplace located between the upper legs, a relatively long heating fireplace located between the lower legs and extending to the rear thereof, a magazine over the rear portion of the latter fireplace and in the rear of the cooking fireplace and of the said water sections, and a flat cooking plate or surface extending over both said cooking fireplace and said magazine, and provided with a removable lid over said magazine.

4. In a combined heating and cooking apparatus, the combination of H-shaped water sections, a relatively short cooking fireplace located between the upper legs, a relatively long heating fireplace located between the lower legs and extending to the rear thereof, a magazine over the rear portion of the latter fireplace and in the rear of the cooking fireplace and of the said water sections, and a flat cooking plate or surface extending over both said cooking fireplace and said magazine, said magazine being provided with a removable cap and said plate or surface being provided with a removable lid located above said cap.

5. In a combined heating and cooking apparatus, the combination of H-shaped water sections, a cooking fireplace located between the upper legs, a heating fireplace located between the lower legs and extending to the rear thereof, said latter fireplace being longer than said former, a transverse water wall at the rear end of the heating fireplace, a magazine for said heating fireplace and located at the rear of said water wall and to the rear of said water sections, and a stove top arranged to be directly heated by said cooking fireplace.

6. In a combined heating and cooking apparatus, the combination of H-shaped water sections, a cooking fireplace between the upper legs and extending to the rear of said water sections, a heating fireplace between the lower legs, a water wall at the rear of the cooking fireplace, a magazine to the rear of said water sections and behind said water wall and above the grate of the heating fireplace, water legs surrounding said magazine and a stove top arranged to be directly heated by said cooking fireplace.

7. In a combined heating and cooking apparatus, the combination of H-shaped water sections, a cooking fireplace between the upper legs, a heating fireplace between the lower legs, a water wall at the rear of the cooking fireplace, a magazine behind said water wall and above the grate of the heating fireplace, water legs surrounding said magazine, said magazine being suspended from the plate resting on said water legs and a stove top arranged to be directly heated by said cooking fireplace.

8. In a combined heating and cooking apparatus, the combination of H-shaped water sections, a cooking fireplace between the upper legs, a heating fireplace between the lower legs, a water wall at the rear of the cooking fireplace, a magazine behind said water wall and above the grate of the heating fireplace, water legs surrounding said magazine, said magazine being provided with a removable cap and a stove top arranged to be directly heated by said cooking fireplace.

9. In a combined heating and cooking apparatus, the combination of H-shaped water sections, a cooking fireplace between the upper legs, a heating fireplace between the lower legs, a water wall at the rear of the cooking fireplace, a magazine behind said water wall and above the grate of the heating fireplace, and water legs surrounding said magazine, said magazine being provided with a removable cap, and a cooking plate or surface above said cooking fireplace and magazine but separated therefrom, said plate or surface having a removable lid above said magazine.

10. In a combined cooking and heating apparatus, the combination of H-shaped water sections, the horizontal member of said section affording water communication between the vertical member, a cooking fireplace between the upper legs, a stove top arranged to be directly heated by said cooking fireplace, a heating fireplace between the lower legs of said sections, an oven at one side of said water sections and passages conducting the gases of combustion of the cooking fireplace around said oven and to a chimney.

11. In a combined cooking and heating apparatus, the combination of H-shaped water sections, a cooking fireplace between the upper legs, a heating fireplace between the lower legs extending to the rear thereof and longer than the cooking fireplace, a magazine at the rear of said cooking fireplace and of said water sections and over said heating fireplace, water legs surrounding said magazine, an oven at one side of said water legs, passages adapted to conduct gases of combustion of said cooking fireplace around said oven and a stove top arranged to be directly heated by said cooking fireplace.

12. In a combined cooking and heating apparatus, the combination of H-shaped water sections, a cooking fireplace between the upper legs, a heating fireplace between the lower legs extending to the rear thereof and longer than the cooking fireplace, a magazine at the rear of said cooking fireplace and of said water sections and over said heating fireplace, water legs surrounding said magazine, an oven at one side of said water legs, passages adapted to conduct gases of combustion of said cooking fireplace around said oven, water legs at the rear of said oven and a stove top arranged to be directly heated by said cooking fireplace.

13. In a combined heating and cooking apparatus, the combination of a relatively short cooking fireplace, a heating fireplace below and longer than said cooking fireplace, a magazine in the rear of the cooking fireplace and over the heating fireplace and a stove top arranged to be directly heated by said cooking fireplace.

14. In a combined heating and cooking apparatus, the combination of a relatively short cooking fireplace, a heating fireplace below and longer than said cooking fireplace, a magazine in the rear of the cooking fireplace and over the heating fireplace, water sections surrounding said fireplaces and a stove top arranged to be directly heated by said cooking fireplace.

15. In a combined heating and cooking apparatus, the combination of a relatively short cooking fireplace, a heating fireplace below and longer than said cooking fireplace, a magazine in the rear of the cooking fireplace and over the heating fireplace, water sections surrounding said fireplace and said magazine and a stove top arranged to be directly heated by said cooking fireplace.

16. In a combined heating and cooking apparatus, the combination of a relatively short cooking fireplace, a heating fireplace below and longer than said cooking fireplace, and a magazine in the rear of the cooking fireplace and over the heating fireplace, an oven at one side of said cooking fireplace, passages for conducting the gases of combustion around said oven and a stove top arranged to be directly heated by said cooking fireplace.

17. In a combined heating and cooking apparatus, the combination of a relatively short cooking fireplace, a heating fireplace below and longer than said cooking fireplace, a magazine in the rear of the cooking fireplace and over the heating fireplace, an oven at one side of said cooking fireplace, and passages for conducting the gases of combustion around said oven, water sections surrounding said fireplaces and a stove top arranged to be directly heated by said cooking fireplace.

18. In a combined heating and cooking apparatus, the combination of a relatively short cooking fireplace, a heating fireplace below and longer than said cooking fireplace, a magazine in the rear of the cooking fireplace and over the heating fireplace, and a flat cooking surface extending over both said cooking fireplace and said magazine.

19. In a combined heating and cooking apparatus, the combination of a relatively short cooking fireplace, a heating fireplace below and longer than said cooking fireplace, a magazine in the rear of the cooking fireplace and over the heating fireplace, water sections surrounding said fireplaces, and a flat cooking surface extending over both said cooking fireplace and said magazine.

20. In a combined heating and cooking apparatus, the combination of a relatively short cooking fireplace, a heating fireplace below and longer than said cooking fireplace, a magazine in the rear of the cooking fireplace and over the heating fireplace, water sections surrounding said fireplace and said magazine, and a flat cooking surface extending over both said cooking fireplace and said magazine.

21. In a combined heating and cooking apparatus, the combination of a relatively short cooking fireplace, a heating fireplace below and longer than said cooking fireplace, and a magazine in the rear of the cooking fireplace and over the heating fireplace, an oven at one side of said cooking fireplace, passages for conducting the gases of combustion around said oven, and a flat cooking surface extending over both said cooking fireplace and said magazine.

22. In a combined heating and cooking apparatus, the combination of a relatively short cooking fireplace, a heating fireplace below and longer than said cooking fireplace, a magazine in the rear of the cooking fireplace and over the heating fireplace, an oven at one side of said cooking fireplace, passages for conducting the gases of combustion around said oven, water sections surrounding said fireplaces, and a flat cooking surface extending over both said cooking fireplace and said magazine.

23. In a combined heating and cooking apparatus, the combination of a relatively short cooking fireplace, a heating fireplace below and longer than said cooking fireplace, a magazine in the rear of the cooking fireplace and over the heating fireplace, and a flat cooking surface extending over both said cooking fireplace and said magazine, said magazine being provided with a cap and said cooking surface with a lid above said cap.

24. In a combined heating and cooking apparatus, the combination of a relatively short cooking fireplace, a heating fireplace below and longer than said cooking fireplace, a magazine in the rear of the cooking fireplace and over the heating fireplace, water sections surrounding said fireplaces, and a flat cooking surface extending over both said cooking fireplace and said magazine, said magazine being provided with a cap and said cooking surface with a lid above said cap.

25. In a combined heating and cooking apparatus, the combination of a relatively short cooking fireplace, a heating fireplace below and longer than said cooking fireplace, a magazine in the rear of the cooking fireplace and over the heating fireplace, water sections surrounding said fireplace and said magazine, and a flat cooking surface extending over both said cooking fireplace and said magazine, said magazine being provided with a cap and said cooking surface with a lid above said cap.

26. In a combined heating and cooking apparatus, the combination of a relatively short cooking fireplace, a heating fireplace below and longer than said cooking fireplace, and a magazine in the rear of the cooking fireplace and over the heating fireplace, an oven at one side of said cooking fireplace, passages for conducting the gases of combustion around said oven, and a flat cooking surface extending over both said cooking fireplace and said magazine, said magazine being provided with a cap and said cooking surface with a lid above said cap.

27. In a combined heating and cooking apparatus, the combination of a relatively short cooking fireplace, a heating fireplace below and longer than said cooking fireplace, a magazine in the rear of the cooking fireplace and over the heating fireplace, an oven at one side of said cooking fireplace, passages for conducting the gases of combustion around said oven, water sections surrounding said fireplaces, and a flat cooking surface extending over both said cooking fireplace and said magazine, said magazine being provided with a cap and said cooking surface with a lid above said cap.

In witness whereof I have hereunto set my hand in presence of two witnesses.

KARL ALT.

Witnesses:
SIEGFRIED HAUSER,
AUGUST OOSTERMAN.

---

Copies of this patent may be obtained for five cents each, by addressing the "Commissioner of Patents, Washington, D. C."